(No Model.)

C. M. TAYLOR.
BOTTLE STOPPER.

No. 328,533. Patented Oct. 20, 1885.

Witnesses.
Will T. Norton
Carrie M. Swett

Inventor
Charles Mackey Taylor
by John J. Halsted & Son
his Attys

UNITED STATES PATENT OFFICE.

CHARLES M. TAYLOR, OF LONDON, ENGLAND, ASSIGNOR OF ONE-HALF TO ANTHONY PERCIVAL TURNER, OF SAME PLACE.

BOTTLE-STOPPER.

SPECIFICATION forming part of Letters Patent No. 328,533, dated October 20, 1885.

Application filed August 24, 1885. Serial No. 175,231. (No model.)

*To all whom it may concern:*

Be it known that I, CHARLES MACKEY TAYLOR, a subject of the Queen of Great Britain, residing at London, England, have invented new and useful Improvements in Bottle-Stoppers, of which the following is a specification.

This invention relates to the construction of an improved screw-stopper for closing bottles having screw-necks.

My improved stopper is constructed in part of a tube or hollow cylinder of suitable metal—such as steel or of other suitable material. The said tube or cylinder is formed by molding or otherwise with a male screw-thread on its periphery, so as to adapt it to be screwed into the neck of a bottle formed with a corresponding female screw-thread. The upper end of the tube or cylinder is provided with a rim or flange, under which is placed a washer of suitable elastic material—such as india-rubber—for the purpose hereinafter described. Into this tubular casing thus formed I then force or screw an ordinary cork or other suitable elastic plug, the said cork being longer than the tubular casing, so as to project from each end thereof, and of a diameter such that it will tightly fit within the casing, the projecting ends expanding to a larger diameter.

Instead of forming the tubular casing with a screw-thread, as hereinbefore described, it will be obvious that the casing may consist of a plain tube provided with two or more projections arranged so as to form parts of a screw-thread.

In order to enable my invention to be fully understood, I will proceed to describe the same by reference to the accompanying drawings, in which—

Figure 1:
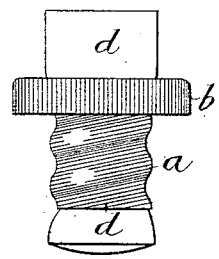
Figure 4:
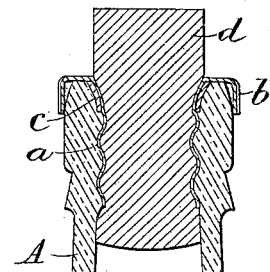
Figure 2:
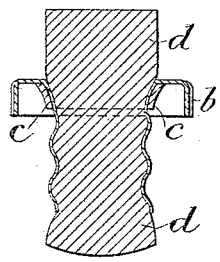
Figure 5:
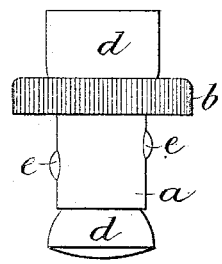
Figure 3:
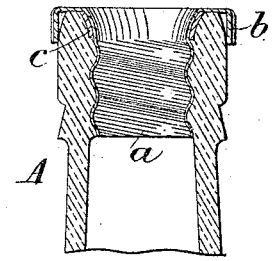

Figure 1 is an elevation, and Fig. 2 a vertical section, of a bottle-stopper constructed according to my invention, the tubular casing being formed with a screw-thread. Fig. 3 is a section of a bottle-neck, showing the screwed tubular casing placed therein previous to receiving the cork when manufacturing the stopper. Fig. 4 is a sectional elevation of part of a bottle, showing the complete stopper inserted in the mouth thereof. Fig. 5 is an elevation showing the stopper with a casing consisting of a plain tube provided with projections arranged to form parts of a screw-thread.

Similar letters in all the figures represent similar or corresponding parts.

Referring to Figs. 1 to 4, *a* represents the tube or hollow cylinder, of suitable metal—such as steel, or of other suitable material—formed, as shown, with a male screw-thread on its periphery, so as to adapt it to be screwed into the neck A of a bottle formed with a corresponding female screw-thread, as shown in Fig. 3. *b* is the rim or flange with which the upper end of the tube or cylinder *a* is provided, and which can be milled or serrated, as shown, to afford a better hold for the fingers when screwing the stopper into a bottle-neck. *c* is the washer, of suitable elastic material—such as india-rubber—which washer, when the stopper is screwed home, forms a tight joint between the mouth A of the bottle and the rim or flange *b*. *d* is the cork, (or other suitable elastic plug,) which is forced or screwed into the screwed tubular casing *a*.

In practice I have found that a convenient mode of manufacturing my stoppers is to first place the screwed tubular casing *a* in the neck A of a bottle, (filled with the liquid to be bottled,) as shown in Fig. 3. The cork *d* is then forced therein by means of an ordinary corking-machine. The cork *d* is longer than the tubular casing and projects from each end thereof, as shown, and is of such a diameter that upon expanding it will tightly fit within the casing *a*, and the lower projecting end, as soon as it passes the throttle, will expand to a larger diameter, so as to form a tight joint in the bottle-neck below the screw-thread thereof, as shown in Fig. 4, further security being obtained by means of the elastic washer *c*, between the flange *b* of the stopper and the mouth A of the bottle.

A stopper of this construction can be easily removed from the bottle, and can be reused by screwing it into the neck of the bottle, and should the elastic plug *d* of the stopper become dirty or worn it can be removed and replaced by another cork or plug.

I have described my improved stoppers as being manufactured by means of an ordinary corking-machine by the same operation as that by which the bottle is corked or stoppered; but it will be obvious that I may employ any other suitable method of manufacturing the stoppers.

The stopper illustrated in Fig. 5 is the same as that hereinbefore described, and shown in Figs. 1 to 4, except that the tubular casing $a$ consists of a plain tube instead of being screw-threaded, and is provided with projections $e$ arranged so as to form parts of a screw-thread.

When the tubular casing $a$ of my improved stopper is formed of a metal liable to be acted upon by the contents of the bottle, it is coated with tin or is otherwise suitably protected.

I have described my improved stopper as being provided with an elastic washer, $c$, between the flange $b$ of the stopper and the mouth A of the bottle; but it will be obvious that this washer may be dispensed with.

By my invention I provide a stopper in which the closing of the bottle is effected by means of cork, thereby preventing the contents of the bottle coming in contact with any objectionable material.

Instead of the milled edge of the flange $b$ of the stopper being turned downward, as shown in the drawings, I sometimes prefer to turn it upward, as will be well understood.

Having now particularly described and ascertained the nature of my said invention, and in what manner the same is to be performed, I declare that what I claim is—

1. An improved stopper for closing bottles having screw-necks, consisting of a hollow cylinder having projections on its periphery adapted to fit into the screw of the bottle-neck, and having an annular flange, $b$, on the end of said cylinder adapted to fit over the mouth of the bottle, and a plug of cork or other suitable elastic material tightly inclosed within said cylinder, all substantially as shown and described.

2. An improved stopper for closing bottles having screw-necks, consisting of a hollow cylinder having projections on its periphery adapted to fit into the screw of the bottle-neck, a washer, $c$, interposed between said cylinder and bottle-neck, and having an annular flange, $b$, on the end of said cylinder adapted to fit over the mouth of the bottle, and a plug of cork or other suitable elastic material tightly inclosed within said cylinder, all substantially as shown and described.

3. An improved stopper for closing bottles having screw-necks, consisting of a hollow cylinder having male and female screw-threads, an annular flange, $b$, on the end of said cylinder, and a plug of cork or other suitable elastic material tightly inclosed within and filling up the female screw-threads of the cylinder, all substantially as shown and for the purposes described.

C. M. TAYLOR.

Witnesses:
B. BRADY,
A. ALBUTT.